Feb. 12, 1935.    B. L. MALLORY    1,990,997
SHOCK ABSORBER
Filed Sept. 12, 1933    2 Sheets-Sheet 1

INVENTOR.
Bonnie L Mallory
BY Hull Brock & West
ATTORNEY.

Feb. 12, 1935.　　　　B. L. MALLORY　　　　1,990,997
SHOCK ABSORBER
Filed Sept. 12, 1933　　2 Sheets-Sheet 2

INVENTOR.
Bonnie L Mallory
BY Hull Brock & West
ATTORNEY.

Patented Feb. 12, 1935

1,990,997

UNITED STATES PATENT OFFICE 1,990,997

SHOCK ABSORBER

Bonnie L. Mallory, Cleveland, Ohio, assignor to Gadget's Inc., Cleveland, Ohio, a corporation of Ohio Application September 12, 1933, Serial No. 689,111

5 Claims. (Cl. 188—130)

This invention relates to a shock absorber of the friction brake, snubber type and has for its principal object to produce a device of this type of the simplest and most inexpensive construction while securing efficiency in operation, durability and convenience of assembly.

Figure 1:
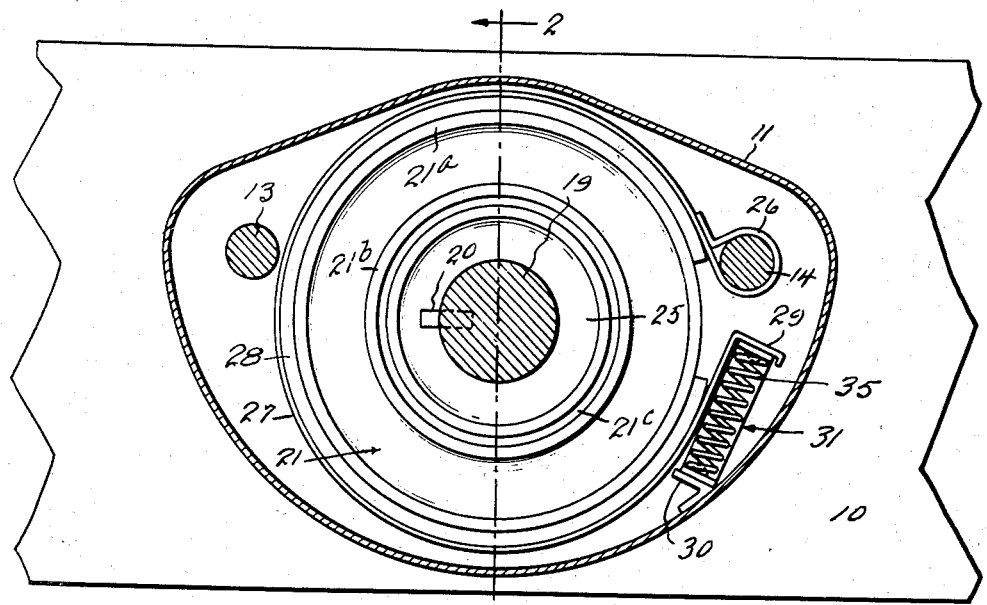
Figure 2:
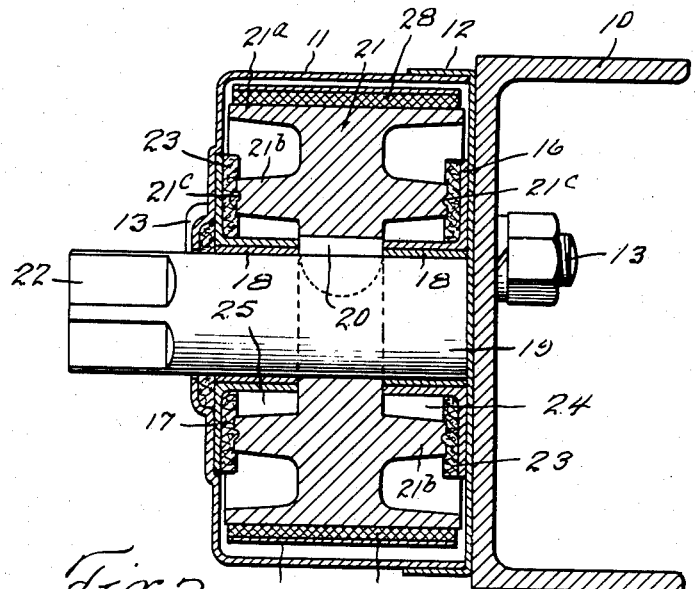
Figure 3:
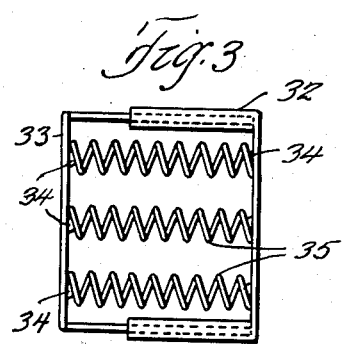
Figure 4:
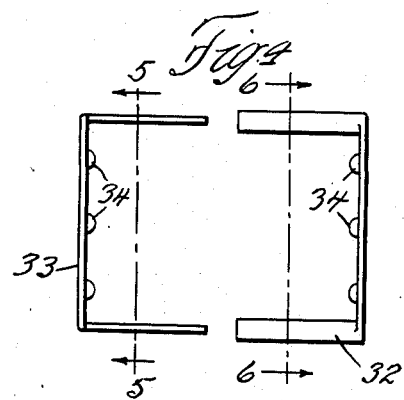
Figure 5:
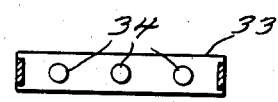
Figure 6:
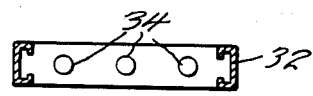
Figure 7:
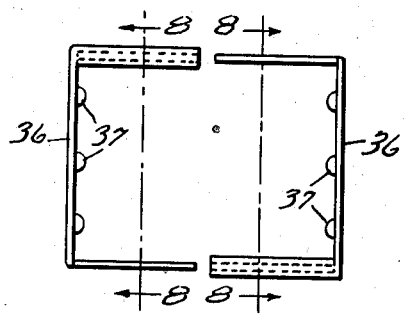
Figure 8:
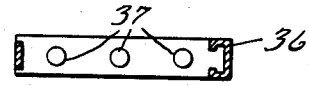
Figure 9:
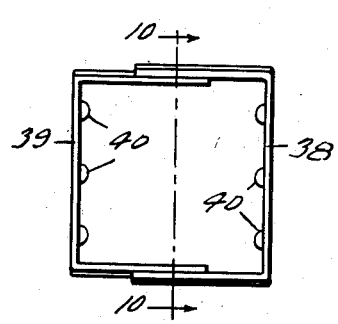
Figure 10:
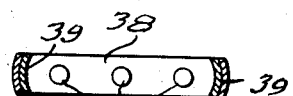

Other and more limited objects will become apparent from the following description when taken in connection with the accompanying drawings in which Fig. 1 is a sectional view taken at right angles to the axis of the drum; Fig. 2 is a section on the line 2—2 of Fig. 1; Fig. 3 is a detail of an expansible unit; Fig. 4 is an exploded view of the same omitting the springs; Fig. 5 is a section on line 5—5 of Fig. 4; Fig. 6 is a section on line 6—6 of Fig. 4; Fig. 7 is a view similar to Fig. 4 showing a modified form of expansible unit; Fig. 8 is a section corresponding to either of the lines 8—8 of Fig. 7; Fig. 9 is a detail view of a further modified form of expansible unit; and Fig. 10 is a section on line 10—10 of Fig. 9.

Referring now to the accompanying drawings, the numeral 10 indicates the frame member of a vehicle, such as an automobile, to which my improved shock absorber is adapted to be attached. The snubbing mechanism is enclosed within a housing made up of a main shell 11 and a cover 12 telescoping thereover. The housing is connected to the frame member 10 by means of bolts 13 and 14 extending through the housing and through said frame member and held in position by suitable nuts 15 and lock washers.

Attached to the housing members 11 and 12, respectively, are bearing members 16 and 17 each consisting of a cylindrical portion within which is received a bushing 18 and a flanged portion which is connected to the housing member by spot welding or other suitable means.

Journaled within the bushings 18 is a shaft 19 to which is keyed, as indicated at 20, a drum member 21. The shaft 19 terminates in a polygonal portion 22 to which an arm is adapted to be connected. The drum member 21 may be a casting provided with a cylindrical drum surface 21ª and sealing cylindrical flanges 21ᵇ concentric with the drum surface 21ª. The ends of the flanges 21ᵇ are preferably provided with grooves 21ᶜ between which and the flanges of the members 16 and 17 are positioned deformable sealing washers 23. With these sealing washers in position, grease may be packed into the spaces 24 and 25 without danger of leaking in the housing where it would come into contact with the friction surface of the drum. Any suitable means may be provided for preventing the escape of lubricant from the space 25 around the shaft 19.

Received on the bolt 14 is the bent-over end 26 of a flexible metal strip 27 which surrounds a friction band 28 and terminates at its other end in a radially outwardly extending abutment 29. Attached to the housing member 11 is a second abutment 30 which may be spot welded thereto. It will be noted that the abutment 29 is located between the bolt 14 and the abutment 30.

Interposed between the abutments 29 and 30 is an expansible unit indicated generally by the numeral 31 which is adapted to urge the said abutments to separate, thereby tending to tighten the friction band against the drum 21. In view of the fact that the space between the abutments is small and it is most convenient to introduce expansion springs thereinto after the assembly of the other parts of the shock absorber except the cover 12, it would be very difficult to insert a plurality of separate springs into position between such abutments. Accordingly, I have provided a self-contained resilient unit including a plurality of springs sufficiently narrow to be received in the space between the housing and drum and embodying containing-and-guide means for holding such springs in proper position and rendering them readily insertable and removable as a self-contained unit. The unit 31 may take any one of several forms, three of which have been illustrated by way of example.

The form shown in Figs. 3 to 6 comprises a U-shaped channel member 32 having legs of C-shaped cross section and a U-shaped bar 33 adapted to telescope within the channel of the member 32. The bight portions of the members 32 and 33 are provided with a plurality of bosses 34 adapted to receive the ends of any desired number of coil compression springs 35. After the springs are placed in position on the bosses 34, the whole may be compressed to the proper length to fit between the abutments 29 and 30 and to exert a predetermined pressure tending to separate them.

In Figs. 7 and 8 I have shown a unit made up of a pair of identical members 36 each of which comprises a U-shaped member having one of the legs C-shaped in cross section and the other of a size to be received within the C-shaped channel of the complementary member. The bight portions may be channel-shaped or otherwise optionally, and are provided with bosses 37 adapted to receive compression springs thereon.

This form will be advantageous in that it will be necessary to manufacture only one shape.

In Figs. 9 and 10 I have shown a unit made up of a pair of telescoping U-shaped members 38 and 39, one adapted to telescope within the other and the legs of both being slightly curved in cross section. The bight portion of both members is provided with a plurality of bosses 40 to receive the springs as in the other forms.

From the foregoing, it will be seen that when the arm rotates in a counterclockwise direction as seen in Fig. 1, both the friction between the friction band and drum 21 and the resiliency of the springs 35 will tend to tighten the friction band whereby to increase the snubbing effect and that when the arm is rotated in the opposite direction, the resiliency of the springs will tend to tighten the friction band while the force of friction tends to loosen it. The result is that by properly selecting the strength and number of springs, it is possible to secure within desirable limits any ratio of "up" and "down" snubbing effect.

It will thus be clear that by the use of very simple mechanism, I have produced an arm snubber which is well adapted for its intended purpose and quite flexible as to snubbing effect and differential between up and down strokes. While I have shown and described the preferred embodiment of my invention, I wish it understood that I am not limited to details thereof but only in accordance with the appended claims and the prior art.

Having thus described my invention, what I claim is:

1. In a shock absorber, a casing, a drum journaled therein, a friction band surrounding said drum, a sheet metal strip surrounding said friction band, said band being anchored to said casing at one end and provided at the other with an outwardly extending abutment, an inwardly extending abutment fixed on said casing and an expansible unit interposed between said abutments and insertable and removable therefrom as a self-contained unit, said expansible unit including a plurality of compression springs and an expansible and contractible holder therefor.

2. In a shock absorber, a casing, a drum journaled therein, a friction band surrounding said drum, a sheet metal strip surrounding said friction band, said band being anchored with respect to said casing at one end and provided at the other with an outwardly extending abutment, an inwardly extending abutment fixed on said casing and an expansible unit interposed between said abutments and insertable and removable therefrom as a self-contained unit, said expansible unit including a plurality of compression springs and an expansible and contractible holder therefor, said holder comprising a pair of U-shaped members, two of the legs of said pair of U-shaped members being of channel cross-section and the other two legs adapted to telescope therein.

3. In a shock absorber, a casing, a drum journaled therein, a friction band surrounding said drum, a sheet metal strip surrounding said friction band, said band being anchored with respect to said casing at one end and provided at the other with an outwardly extending abutment, an inwardly extending abutment fixed on said casing and an expansible unit interposed between said abutments and insertable and removable therefrom as a self-contained unit, said expansible unit including a plurality of compression springs and an expansible and contractible holder therefor, said holder comprising a pair of U-shaped members, one leg of each of said U-shaped members being C-shaped in cross section and the other leg adapted to telescope within the channelled leg of the other member.

4. In a shock absorber, a casing, a drum journaled therein, a friction band surrounding said drum, a sheet metal strip surrounding said friction band, said band being anchored with respect to said casing at one end and provided at the other with a right angularly outwardly extending abutment, an inwardly extending abutment fixed on said casing and an expansible unit interposed between said abutments and insertable and removable therefrom as a self-contained unit, the point of anchorage of said strip and said abutments being in substantial alignment.

5. In a shock absorber, a casing, a drum journaled therein, a friction band surrounding said drum, a sheet metal strip surrounding said friction band, said band being anchored with respect to said casing at one end and provided at the other with a radially outwardly extending abutment, an inwardly extending abutment fixed on said casing and an expansible unit interposed between said abutments and insertable and removable therefrom as a self-contained unit, said expansible unit including a plurality of compression springs and an expansible and contractible holder therefor, said holder comprising a pair of U-shaped members, curved in cross section and having the legs of one telescoping between those of the other.

BONNIE L. MALLORY.